Nov. 25, 1930.  W. T. ARNOLD  1,782,454
ELECTRICAL METER SWITCH
Filed June 3, 1929   2 Sheets-Sheet 1

WILLIAM T. ARNOLD.
INVENTOR

BY Victor J. Evans
ATTORNEY

WITNESS

Nov. 25, 1930.  W. T. ARNOLD  1,782,454
ELECTRICAL METER SWITCH
Filed June 3, 1929  2 Sheets-Sheet 2

WITNESS:

WILLIAM T. ARNOLD
INVENTOR
BY Victor J. Evans
ATTORNEY

Patented Nov. 25, 1930

1,782,454

UNITED STATES PATENT OFFICE

WILLIAM T. ARNOLD, OF HEMPSTEAD, NEW YORK

ELECTRICAL METER SWITCH

Application filed June 3, 1929. Serial No. 368,084.

This invention relates to improvements in electrical meters or detecting instruments for use in electric burglar alarm systems.

The primary object of the invention resides in an electrical instrument for indicating the correct condition of the "day" and "night" circuit of a burglar alarm system such as are used in the protection of bank vaults, jewelers' safes, stores, lofts and the like to enable the watchman at the central station to keep a close watch on the condition of the circuits of the individual subscribers' systems. Heretofore in instruments of this kind should a break or short circuit occur in a subscriber's day wiring, the watchman or operator would only receive a break signal but no cross or short circuit unless each subscriber's premises was tested individually by a meter or galvanometer. Hence by this device, the day wiring can be kept under control both on a break cross or short circuit in said wiring.

Another object of the invention is to provide an electrical meter instrument operable by the amount of resistance in the circuits in which it is arranged and which includes an indicating needle which will come to an abrupt stop when actuated upon any change in the voltage or resistance without rebound. This objection is found in the best of "dead beat" instruments now in use when a sudden impulse is imparted to the indicating needle and which is not readable when the movement of the needle to a certain position serves to close another circuit.

Another object of the invention is the provision of an electrical instrument of the above kind in which a pivoted indicating needle acts as a switch arm for successively closing two circuits on each side of its axis, depending upon the direction of pull upon the needle, there being two contacts on each side of its axis, one of which is more flexible than the other and engageable with the other by reason of the engagement of the needle with the more flexible contact.

With these and other objects in view, the invention resides in certain novel construction and combination and arrangement of parts, the essential features of which are hereinafter fully described, are particularly pointed out in the appended claims, and are illustrated in the accompanying drawing, in which :—

Figure 1 is a front elevation of my improved electrical instrument showing a portion of the casing broken away.

Figure 2 is a vertical transverse sectional view on the line 2—2 of Figure 1.

Figure 3 is a vertical sectional view on the line 3—3 of Figure 2.

Figure 4 is an enlarged detail sectional view on the line 4—4 of Figure 1.

Figure 5:
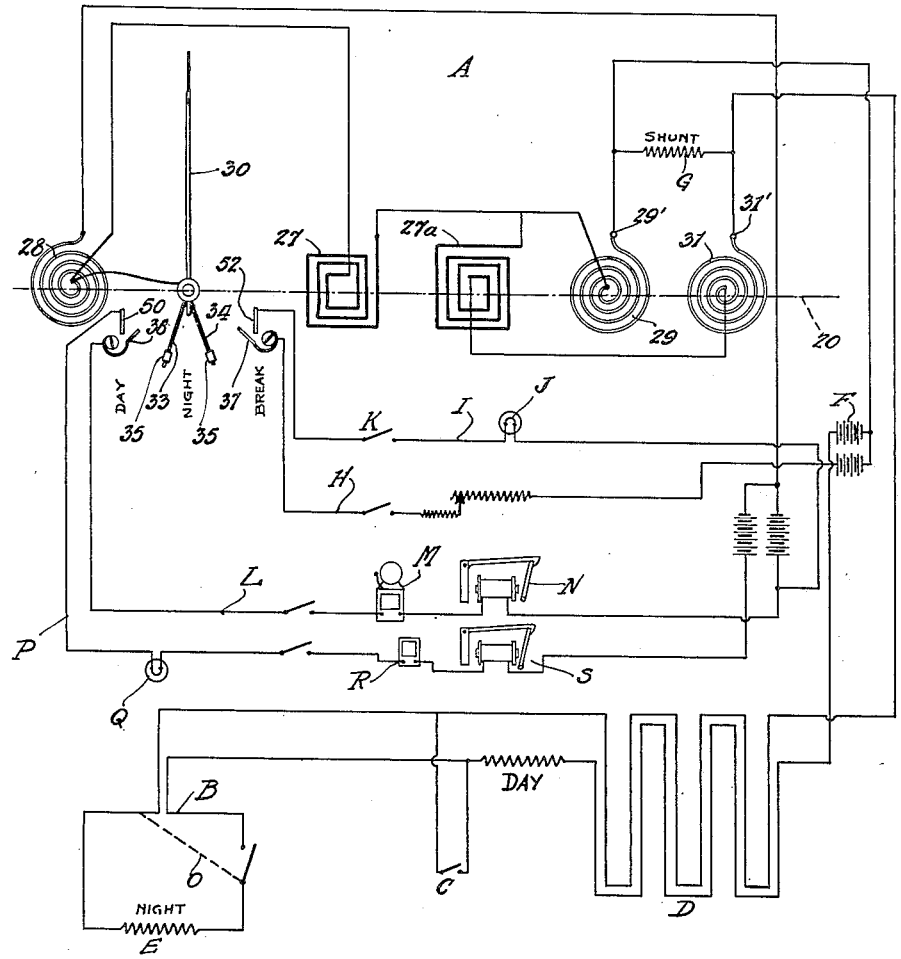
Figure 5 is a diagrammatic view of a burglar alarm system showing my improved instrument installed therein.
Figure 6:
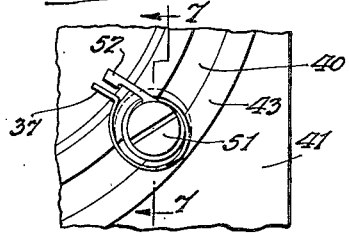
Figure 6 is an enlarged front elevation of one of the double contacts.
Figure 6:
Figure 7:
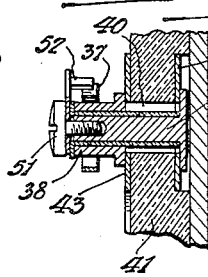
Figure 7 is a vertical sectional view on the line 7—7 of Figure 6.

Referring to the drawings by reference characters, the numeral 10 designates my electrical governing instrument in its entirety which includes a rectangular shaped casing 11, the open front of which is closed by a removable cover 12 having a transparent glass window 13 therein. Mounted within the casing is a vertical partition 14, the front of which supports a dial plate 15 having an arcuate shaped dial 16 thereon. The center graduation of the dial is marked "Night" while the left end graduation is marked 0 and the right end one marked 5. The opposite sides of the dial also bear the markings "Break" and "Day," the same being disposed at equal distances from the center mark "Night". The purpose of these markings will appear as the invention is better understood. The said dial 16 is disposed directly behind the window 13 so as to be visible from the front side of the casing.

Extending rearwardly from the partition 14 is a bracket 17 which supports the spaced poles 18—18 of a horse-shoe magnet 19. A shaft 20 extends transversely of the casing between the poles 18, one end being journalled in an upturned arm 21 on the bracket while the other or front end of the same has its bearing in a bearing bar 22 mounted on a ring 23 of insulating material fixed to the front side of the partition 14, and which bar bridges said ring. The shaft 20 freely passes through a stationary soft iron core 24 disposed between the poles 18—18, while fixed to said shaft and surrounding said core is a coil 25, the windings of which are of opposed polarity. The coil includes a spool 26 insulated from the shaft 20 it being noted by reference to Figure 4 of the drawing that the ends of the shaft extending beyond the core 24 are covered with insulating sleeves. An inner coil 27 is wound upon the spool 26, one end of which is electrically connected to a coil spring 28 and its other end to a coil spring 29. The coil spring 28 is located at the forward end of the shaft 20 and has one end fixed thereto while its other end is electrically connected to an indicating needle 30 of conducting material and which needle is in turn fixed to the spool 26 so as to turn therewith. The needle is disposed forward of the partition so as to traverse the dial 16. The spring 29 has one of its ends fixed to the shaft 20 while its other end connects with a terminal 29' to which a wire of a circuit in which the instrument is arranged is adapted to be attached. Another coil spring 31 is mounted adjacent the coil spring 29 and also has one of its ends fixed to the shaft 20 while its other end is connected to a terminal 31' for a wire connection. The spool 26 is also provided with an outer winding or coil 27ª, one end of which is electrically connected to the coil spring 29 and its other end is electrically connected to a coil spring 31. Another coil spring 32 is provided forward of the coil, and has one end attached to the indicating needle and its other end to a stationary part adjacent thereto. The coil springs 29 and 31 are wound in an opposite direction to the coil springs 28 and 32 and serve to place an even tension upon the shaft to normally hold the indicating needle in a break position.

The tail end of the needle 30 is provided with diverging branch legs 33 and 34 both of which carry weights 35 to aid in keeping the indicating needle in a normally vertical position. The legs 33 and 34 are respectively movable into contact engagement with flexible adjustable contacts 36 and 37. Each contact 36 and 37 is mounted on a collar 38 mounted on a headed stud 39 passing through an arcuate shape slot 40 in a vertically disposed wall 41 of insulating material and which is attached to the front of the partition at the bottom thereof. The collar 38 is insulated from the stud and the collar of the contact 36 rides over a contact strip 42 while the collar 38 of the contact 37 rides over a contact strip 43. The head of the stud of the contact 36 rides against a contact strip 44 on the rear side of the wall 41 while the head of the stud of the contact 37 rides against a contact strip 45 also on the rear side. Terminals 46 and 47 respectively connect to the contact strips 42 and 43 while similar terminals 48 and 49 respectively connect with the contact strips 44 and 45. Carried by the collar 38 of the contact 36 is a flexible contact 50 extending into the path of flexing movement of the contact 38 and which is electrically connected to the stud of that contact by a clamping screw 51. A similar contact 52 is carried by the stud supporting the contact 37 so that the contacts 36 and 50, and contacts 37 and 52 are always in spaced relation to each other and each set is adjustable together and with respect to the other set. The legs 33 and 34 of the indicating needle 30 travel in the plane of the contacts 36 and 37 respectively to be engaged thereby and by reason of their extreme flexibility the same will successively engage the contacts 50 and 52 respectively depending upon which coil 27 and 28 is energized. In other words, two circuits may be successively closed by the actuation of the indicating needle upon movement of the same in either direction.

Although my electrical meter instrument may be used for various purposes, I have illustrated in Figure 5 of the drawing a diagrammatic view of a burglar alarm system such as shown in my prior Patent No. 587,779, dated August 3rd, 1897, in which the instrument 10 takes the place of the polarized relay shown therein for controlling an alarm system. This polarized armature gives two indications, one on the "break" or open side of the circuits and one on a "cross" ground, or resistance shunted side of the circuits. My improved governor instrument indicates the "cross" and "break" in the circuits in a more efficient manner. As hereinbefore mentioned the movable coil of the instrument is provided with a double winding of opposite polarity which controls the movement of the indicating needle, and which movement is governed by the amount of resistance and voltage in the circuits with which the instrument is operatively connected.

In the diagrammatic view A designates the protective system which includes what I shall term a night circuit B which protects all openings in a building such as doors, windows, fan lights, floor traps and which is left open during the day time by closing a switch C so that the current is shunted through the day or stationary wiring D. The night circuit includes a resistance E, for example 600 ohms while the day circuit includes a resistance of for example 300 ohms. The circuit includes a battery or source of energy F and the reversely wound coils 27 and 27ª connected in the circuit through the respective coil springs 29 and 31, coil spring 28 and indicating needle 30. The wires leading to the coil springs 29 and 31 are shunted as at G.

When the circuits are set for operation, the needle is in vertical position in register with the "Night" mark on the dial. Should a momentary break occur in the main circuit, the coil 27ᵃ becomes dormant, no current passing through the same whereupon the indicating needle will be moved by the increased voltage in the coil 27 to the "Break" side of the dial. In moving to this position, the leg 34 of the needle strikes flexible contact 37 closing the local circuit H. The instant the needle touches contact 37 a new counter-circuit is formed in an opposite direction to the main circuit, causing the needle to move further to force contact 37 into engagement with contact 52 closing an alarm circuit I in which a lamp J or other visible or audible signal is arranged. It is of course understood that the governor instrument is installed in a central station as is the lamp J, thus the operator or watchman is notified of the break in a particular subscriber's system. Heretofore, governor meters have included one or two contacts but the indicating pointer or needle would rebound on a break in the circuit owing to the quickness of the impulse and would return to its normal position without closing the local signal circuit. In my instrument this cannot happen as the needle will remain in its position after a break until the switch arranged in the local circuit H has been opened as the current passing through the coil 27 is regulated to overcome the main circuit current and holds the needle and movable coil in open or "dead" position even though the break is for a fraction of a second. If upon closing of the switch K, the needle returns to its normal position, the circuit is normal again either to the day or night position as the case may be.

The contacts 36 and 50 are arranged on the cross or day side, it being understood that contact 36 is more flexible or resilient than contact 50. The contact 36 is arranged in a local alarm circuit L which includes a bell M and drop N, coil spring 28 and leg 33 of the needle 30. When the night wiring and night resistance is shunted out by closing switch C, the voltage in the main circuit is increased and the indicating needle is moved to the day side and the leg 33 contacts with contact 36. Should the resistance coil E be cut out by a cross as shown in dotted lines at O the needle will be caused to move further and contact 36 will engage contact 50 which is arranged in an alarm circuit P including a visual signal such as a lamp Q, audible signal such as a buzzer R and a drop S. The closing of this circuit causes the sounding of an audible alarm and visual signal at the central station. From the foregoing, it will be manifest that the day wiring can be kept under control both on a break or short circuit in a subscriber's day wiring, whereas heretofore, an operator would only receive a break signal but no cross or short circuit, unless each of the subscribers' premises was tested individually with a meter or galvanometer.

As hereinbefore mentioned, the invention resides in the instrument 10 wherein the balanced indicating needle is operable by coils of opposite polarity, for engagement with a pair of adjustable contacts disposed on opposite sides of the vertical axis thereof, the said contacts being relatively resilient for engagement with other contacts arranged in a fixed relation thereto, to cause the indicating needle to come to a dead stop when moved to positively close the circuits which it controls.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In an electrical governing instrument, a rotatable coil having a double winding of opposite polarity, an indicating needle fixed to said coil, and sets of contacts respectively disposed on opposite sides of the axis of said coil in the path of said needle, each set of contacts including a pair of spaced contact elements engageable with each other upon contacting engagement with one of said contact elements by said needle to successively close separate electric circuits in which said needle and said sets of contacts are arranged.

2. In an electrical governing instrument, a rotatable coil having a double winding of opposite polarity, an indicating needle fixed to said coil, and sets of contacts respectively disposed on opposite sides of the axis of said coil in the path of said needle, means for adjustably mounting said sets of contacts relative to each other in the path of said indicating needle, each set of contacts including a pair of spaced contact elements engageable with each other upon contacting engagement with one of said contact elements by said needle to successively close separate electric circuits in which said needle and said set of contacts are arranged.

3. In an instrument of the class described, a magnetically controlled pivoted indicating needle, sets of spaced contacts mounted on opposite sides of the pivotal axis of said needle, each set of contacts including a pair of spaced resilient contact elements, one of said contact elements being in the path of movement of said needle and of greater resiliency than the other for engagement by said needle and for subsequent engagement with the other contact element whereby said needle may successively close two individual electric circuits in which said sets of contacts and said needle are adapted to be arranged on movement of said needle in either direction.

4. In an electrical instrument, a magnetically controlled pivoted indicating needle, a set of spaced contacts including a pair of spaced resilient contact elements, one of said elements being more resilient than the other and disposed in the path of said needle for engagement thereby for engagement with each other by the movement of said needle, and means for adjustably mounting said set of contacts in a plane at right angles to the pivotal axis of said needle, said means including an insulated body having an arcuate shape slot therein, contact strips on opposite sides of said body following the curvature of said slot, a headed stud passing through said slot, the head of the stud riding over one of said contact strips, a collar insulated from said stud and engaging the other contact strip, one of said contact elements being carried by said collar and the other directly carried by said stud.

In testimony whereof I have affixed my signature.

WILLIAM T. ARNOLD.